US007930209B2

(12) United States Patent
Mayo (10) Patent No.: US 7,930,209 B2
(45) Date of Patent: *Apr. 19, 2011

(54) TRANSACTION SYSTEM AND METHODOLOGY WITH INTER-PARTY COMMUNICATIONS CAPABILITY

(75) Inventor: Anthony Paul Mayo, Reston, VA (US)

(73) Assignee: Michael J. Chiaramonte, Clinton, MD (US)

(*) Notice: Subject to any disclaimer, the term of this patent is extended or adjusted under 35 U.S.C. 154(b) by 0 days.

This patent is subject to a terminal disclaimer.

(21) Appl. No.: 12/398,485

(22) Filed: Mar. 5, 2009

(65) Prior Publication Data
US 2009/0171792 A1   Jul. 2, 2009

Related U.S. Application Data

(63) Continuation of application No. 10/744,009, filed on Dec. 24, 2003, now abandoned, which is a continuation of application No. 09/549,572, filed on Apr. 14, 2000, now Pat. No. 6,678,663.

(51) Int. Cl.
  *G06Q 30/00* (2006.01)
(52) U.S. Cl. .................................................. 705/14.23
(58) Field of Classification Search .................... 705/14, 705/14.23
  See application file for complete search history.

(56) References Cited

U.S. PATENT DOCUMENTS

| 5,668,953 A | 9/1997 | Sloo |
| 5,754,938 A * | 5/1998 | Herz et al. ..................... 725/116 |
| 5,794,210 A | 8/1998 | Goldhaber et al. |
| 5,855,008 A | 12/1998 | Goldhaber et al. |
| 6,119,101 A | 9/2000 | Peckover |
| 6,295,552 B1 * | 9/2001 | Shibata ......................... 709/206 |
| 6,330,543 B1 | 12/2001 | Kepecs |
| 6,684,196 B1 * | 1/2004 | Mini et al. ...................... 705/26 |
| 2002/0022993 A1 | 2/2002 | Miller et al. |

FOREIGN PATENT DOCUMENTS

WO    WO 00/17775    3/2000

OTHER PUBLICATIONS

David Birch is a consultant and diretore of Hyperion, the IT management consultancy; Guardian dated Oct. 14, 1999.
SmartAge.com bolsters services with a new suite of eCommerce services for small businesses; Business Wire dated Feb. 15, 2000.

* cited by examiner

*Primary Examiner* — John G Weiss
*Assistant Examiner* — M Hamilton
(74) *Attorney, Agent, or Firm* — McGuireWoods, LLP (57) ABSTRACT

In a preferred embodiment of the present invention, although not necessarily limited thereto, the system of the present invention may function in the context of an internet based commercial real estate brokering system. In such a system, potential buyers, sellers, lessors and lessees list and respond to offerings having characteristics as described in connection with the listings. For example, a potential landlord may, through interaction with the system of the present invention, list one or more buildings for lease. Communication and interaction may occur on an anonymous basis such that the potential landlord is unaware of the actual identity of the prospective tenant and vice versa until such time as one or the other or both decide to reveal their identity.

30 Claims, 8 Drawing Sheets

FIG. 1

| | | 200 | | | |
|---|---|---|---|---|---|
| About Us \| Contact Us | | Welcome back, Kristine. | | Relocation Tools | | findAspace™ | listAspace™ | my desktop | MessageManager™ | help | logout

This notebook changes everything — COMPAQ Better answers

| Listing | Current Listing End Date | Start Date (mm/dd/yyyy) (230) | No. of Months (240) | Cost per Month (250) | Pay? (220) |
|---|---|---|---|---|---|
| 10914 Thanlet Lane | | 03/14/2000 | 6 | Prenegotiated | ☑ |
| 10915 Thanlet Lane | | 03/14/2000 | 3 | Prenegotiated | ☐ |
| 10920 Thanlet Lane | | 03/14/2000 | 3 | Prenegotiated | ☐ |
| 4000 Tunlaw Condominium | | 03/14/2000 | 3 | Prenegotiated | ☐ |
| 4000 Tunlaw Condominium | | 03/14/2000 | 3 | Prenegotiated | ☐ |
| 4000 Tunlaw Condominium | | 03/14/2000 | 3 | Prenegotiated | ☐ |
| 4000 Tunlaw Condominium | | 03/14/2000 | 3 | Prenegotiated | ☐ |

[ Continue ] [ Reset ]

Start building your e-commerce site Now

All Topics Help | Live Assistance | Contact findAspace™ | 800-754-9874 | tellAfriend™

© 2000 findAspace.com, inc.

FIG. 2

FIG. 3 email_renewal.txt

From: r1234567r@findAspace.net /410

Sent: Monday, March 13, 2000 5:37 PM /420

To: jones@anywhere.com /430

Subject: Time to Renew Your Listing on Pine Street

Dear Mr. Jones,      440

Your listing number 123987, for the property at:

12 Pine Street
Reston, VA 22090 will expire in 20 days unless you act soon.

We notice that 231 finders viewed your listing, it was placed on 35 shortlists, and that you received 22 messages inquiring about it. } 450

Hit reply on this email and findAspace will extend the promotion period for your listing an additional three months. The credit card you used to pay for the listing will automatically be charged $15.00 to cover this additional promotion period. } 460

No need to visit the web site. Just reply to this email message. You will receive a confirmation email after your listing has been extended and your account has been charged.

Thanks,
Tony Mayo
President

| About Us | Contact Us | Welcome back, Kristine. | Relocation Tools | findAspace — intel inside pentium II — This notebook changes everything — COMPAQ Better answers

| findAspace™ | listAspace™ | my desktop | MessageManager™ | help | logout |

Kristine's findAspace desktop

My Listings

| 10914 Thanlet Lane | Change | 1 msg(s), 0 new |
| 10915 Thanlet Lane | Change | 1 msg(s), 1 new |
| 10920 Thanlet Lane | Change | 0 msg(s), 0 new |
| 4000 Tunlaw Condominium | Change | 0 msg(s), 0 new |
| 4000 Tunlaw Condominium | Change | 0 msg(s), 0 new |

630

Next 5 >>

620

610

My Saved Searches

| DC metro | Search | 0 listings, 0 new |
| DC metro | Search | 17 listings, 11 new |
| metro dc | Search | 17 listings, 11 new |
| metro dc | Search | 0 listings, 0 new |
| reston office | Search | 2 listings, 0 new |

My Short Lists

| short list 1 | Change | 0 new msg(s) |
| Jan2000 | Change | 1 new msg(s) |

My Shared Listings
Currently you have not been designated any listings.

Membership Information  Change
Trusted Member List  Change

Start building your e-commerce site Now

| All Topics Help | Live Assistance | Contact findAspace™ | 800-754-9874 | tellAfriend™ |

© 2000 findAspace.com, inc.

TRANSACTION SYSTEM AND METHODOLOGY WITH INTER-PARTY COMMUNICATIONS CAPABILITY

CROSS-REFERENCE TO RELATED APPLICATIONS

This application is a continuation application of U.S. patent application Ser. No. 10/744,009, filed Dec. 24, 2003 now abandoned, which is a continuation application of U.S. patent application Ser. No. 09/549,572, filed Apr. 14, 2000 now U.S. Pat. No. 6,678,663, the disclosures of which are now incorporated herein by reference in their entirety.

FIELD OF THE INVENTION

The present invention relates generally to processing transactions on the Internet and more particularly to systems and methods for efficiently and optimally processing and administering transactions between parties including interactions with brokers, agents, and those parties that offer advertising services.

BACKGROUND OF THE INVENTION

The amount of commerce being conducted on the Internet is exploding. Both business to business (B2B) and business to consumer (B2C) transactions are more popular than ever in large part due to the conveniences and benefits available through the use of the Internet to process transactions. Advertising is one service that is particularly well suited for the Internet. There are a multitude of companies that offer advertising through websites, bulletin boards, email and other technologies associated with the Internet.

There are various business processes associated with the operation and maintenance of an advertising service on the Internet. For example, an operator of such a service must make its service availability known to potential customers. This can be done through traditional advertising, web-based advertising, partnerships, co-branding relationships and other ways. In addition, once a large number of listings are obtained, the operator must be in a position to bill for the listings preferably on an automated basis. It is desirable for the billing function to include a way to collect, monitor and credit payments made on account.

In many cases, it is also desirable for a service operator to provide for automatic renewals of advertising services. Automatic renewals provide a way for the operator to achieve incremental revenue from entities and/or individuals that have shown a propensity to take advantage of the advertising services offered by the operator. In addition to advertising, the operator may want to make available other services and/or product offerings which may or may not be related to the context of the advertising. Since demographic information concerning advertisers and possibly potential respondents is often captured by the operator, targeted offerings may be made available and are often successful.

There exist techniques for automatically renewing advertisements and making offers available through the Internet. One typical scenario involves an advertiser or other user navigating to the operator's website and providing information which usually includes an email address. Once the user signs up for an advertisement or other service, renewal may be accomplished and offerings may be made via the generation (either manually or automatically) of an email which is sent to a specified email address. Typically, the email message contains a "subject line" which contains information specific to the offer or, in the case of the renewal of advertising, the advertiser's advertisement. Often times, this subject line is composed of a cryptic string of numbers and letters which are coded to reflect the offer or advertisement. The email may also contain a message to the user asking whether he or she is interested in renewing the advertisement or accepting a particular offer. If the user is interested, he or she is instructed to reply to the message by selecting the "reply to" button on their internet browser application. By doing so, the user is causing an email with the pre-designated subject line to be sent to a particular email address which is typically controlled by the operator. In most cases capability is provided such that upon receipt of this reply email by the operator, a software application or similar functionality can process the renewal or offer acceptance automatically.

Unfortunately, this procedure suffers from some drawbacks. First, since the subject line is accessible to and may be manipulated by the user, there is the potential for the user to either accidentally or intentionally manipulate the response so as to create an error. For example, if the user were to change a digit in a string of characters, it could cause a processing error when received by the service provider and this, in turn could result in a lost sale, customer dissatisfaction and/or a dispute. A second consequence resulting from the accessibility of the subject line is the possibility for a security breach. If a user can figure out the "code", it is possible that the user could intentionally cause processing errors in order to defraud the system and/or cause it to crash. In addition, some email application programs (e.g. Eudora and Microsoft Outlook) may be configured to automatically modify a subject line in connection with a reply email. By way of example, these applications may automatically modify the subject line when a reply is made by inserting a character string such as "re:" followed by the original subject line. As mentioned above, such a modification can present problems in connection with prior art systems that rely on the string contained in the subject line.

Another drawback of the prior art systems and methodologies is that there exist significant problems in the case where a user may maintain more than one email account. In such a case, when an email is automatically generated and sent to a user, the user's origination "from address" may not be recognized (and thus the transaction will not be properly processed) if the user replies from an email account which is not the same as the one initially specified in the registration process.

Another specific benefit of advertising (or in any proposed business transaction) in the Internet context which may be made available to users is the ability for each of the parties to a potential transaction to communicate with each other regarding the potential transaction. For example, an advertiser may list a certain office space for rent through an Internet service. Once posted, one or more individuals may view the advertisement and some or all of those viewing the advertisement may be interested in exploring further. By way of example, a potential renter viewing a rental listing may obtain the landlord's email address from the listing, send the landlord an email including questions about the property and await a response. Following that, the landlord may or may not respond to the interested party by sending a reply email.

In some situations, this procedure does not present problems. However, there are certain situations where advertisers and/or those responding to listing may wish to preserve their confidentiality. For example, an employer may wish to list a new position as a "blind" listing such that nobody knows who the company is and/or what the position is until such time as the employer wishes to disclose such information. Further, a potential employee may wish to maintain the confidentiality of his or her identity until such time as he or she wishes to disclose such information. This is often not possible or is very difficult once email addresses are disclosed.

Thus, while internet based advertising and other web sites have come a long way towards user convenience and usability, some aspects of the related transactions still suffer from various problems including those related to security, confidentiality and convenience.

SUMMARY OF THE INVENTION

It is therefore an object of the present invention to overcome the disadvantages and drawbacks of prior art systems and methods.

It is another object of the present invention to provide a system and methodology which permits advertising service providers as well as other service providers to efficiently and accurately bill their customers and track advertising orders and renewals.

It is yet another object of the present invention to provide a system and methodology which permits advertisers to conveniently order and renew advertising services.

It is a further object of the present invention to provide a system and methodology which permits parties to a potential transaction to interact with each other in connection with and prior to consummating a proposed transaction.

It is a still further object of the present invention to provide a system and methodology which permits such interaction to occur on an anonymous basis up until the time that one or more parties wishes to disclose its own identity.

It is a yet further object of the present invention to permit parties to a potential transaction to communicate with one another without subjecting themselves to unwanted email communications or other solicitations.

The above and other objects are achieved through the novel transaction management system of the present invention. In a preferred embodiment of the present invention, although not necessarily limited thereto, the system of the present invention may function in the context of an internet based commercial real estate advertising system. In such a system, potential buyers, sellers, lessors and lessees list and respond to offerings having characteristics as described in connection with the listings. For example, a potential landlord may, through interaction with the system of the present invention, list one or more buildings for lease. Particular characteristics of the property may be provided in connection with the listing including, for example, location, square footage, applicable zoning restrictions, build-out possibilities and more. Potential tenants may peruse the listings via the system of the invention and interact with the potential landlord through electronic mail.

This communication and interaction may occur on an anonymous basis such that the potential landlord is unaware of the actual identity of the prospective tenant and vice versa until such time as one or the other or both decide to reveal their identity. According to the teachings of the present invention, in addition to maintaining the confidentiality of the identity of the potential parties, it is also possible to avoid the need to reveal any contact information associated with either party (including, for example, email addresses, phone numbers, addresses, etc.) until such time as a party wishes to disclose such information.

Another aspect of the system of the present invention provides users of the transaction system as well as the operator thereof with the ability to conveniently and accurately track orders and renewals of listings. According to a preferred embodiment of the present invention, when an advertiser wishes to initiate or renew an advertisement, the system of present invention provides various payment options. One possible option the advertiser may select is for billing to occur via an automated email process involving, for example, a credit card charge. In such a case, when payment becomes due either at the initiation or renewal of an advertisement, the advertiser may be notified by an automatically generated email with a specifically generated "reply-to address". All that is necessary from the advertiser's point of view at this point to is select and activate the "reply" button on, for example, the advertiser's email application screen. Once this is done, a reply email is sent to and received by the system of the present invention and, based upon the specific "reply to address", the system processes the reply and carries out the automated billing process.

As will be described in greater detail below, the novel features of the present invention are not by any means limited to transactions occurring in commercial real estate context or even with respect to real estate generally. By way of example only, the benefits of the present invention particularly with respect to anonymity and automated billing can offer great value in many other contexts and industries including, job search sites, dating/relationship sites, sites permitting or facilitating exchanges of materials or services, sites offering postings and responses to RFP's and the like, sites providing collective procurement, or any other environment where internet based transactions may occur. In addition, the teachings of the present invention may be beneficially applied in the context of repetitive billing such as when a utility bills customers on a monthly basis. While the present invention will be described in the context of an internet based commercial real estate listing service, those of skill in the art will recognize that the teachings of the present invention have applicability across a great many industries and with respect to a great many transactions.

DETAILED DESCRIPTION OF THE PREFERRED EMBODIMENTS

The present invention is preferably practiced in an Internet environment such that an operator of the system ("System")

may, in a preferred embodiment, maintain software which implements the processes of the present invention on one or more server computers. As mentioned above, the description provided herein is specific to an embodiment where commercial real estate is listed, rented and sold. However, the teachings of the present invention are not limited thereto. In the commercial real estate embodiment, various users including potential landlords, tenants, sellers and buyers may list, view and communicate with respect to properties listed on the system. In a preferred embodiment, each of these users interacts with the system via the Internet as is known in the art. As such, these users may access the system and the particular applications provided thereby via a browser running on a user's personal computer or other access device. Other possibilities for connectivity are also possible. For example access may be via a private communications network, intranet, direct dial up access or any other communications medium and/or protocol now existing or developed in the future.

Figure 1:
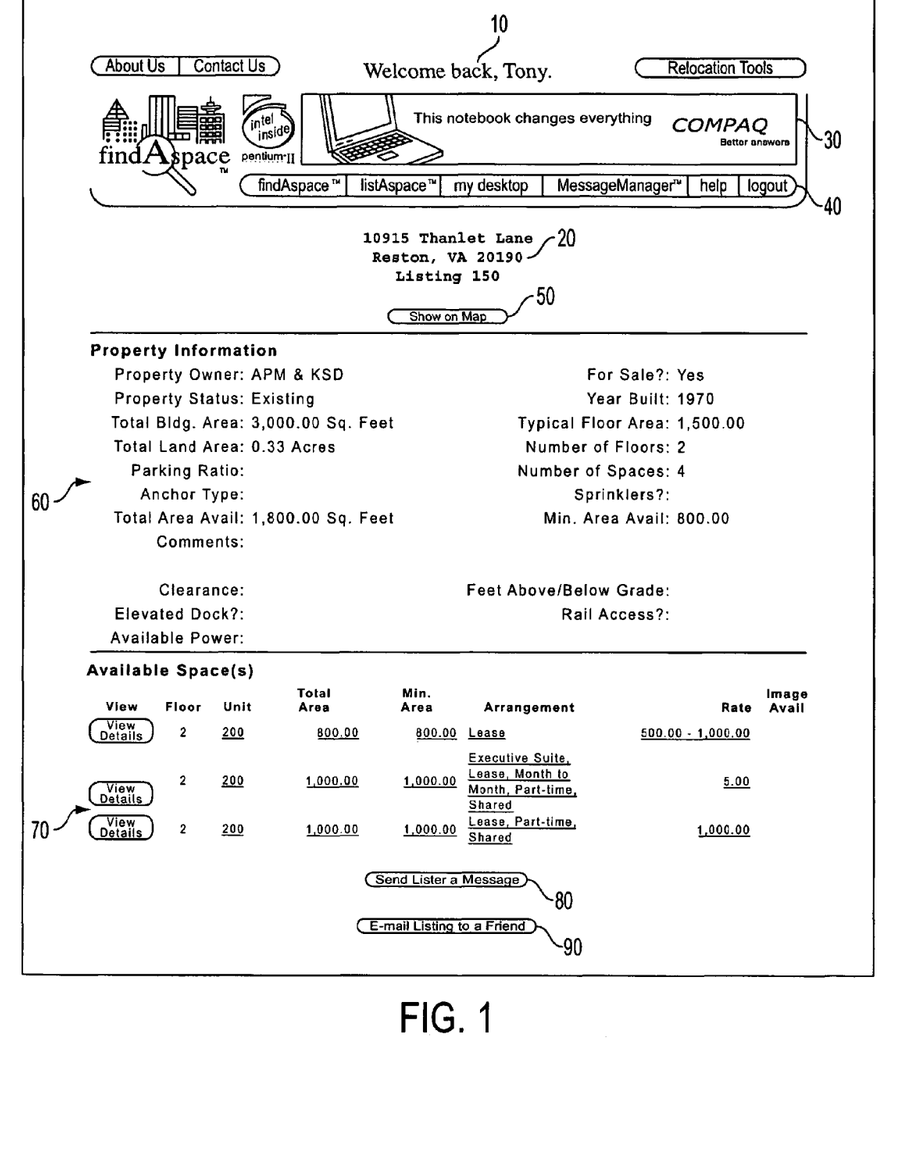
FIG. 1 is a screen shot illustrating an exemplary property listing that may be constructed, viewed and processed according to the teachings of the present invention.

FIG. 1 is a screen shot showing an example of a commercial real estate listing which has been entered into the system. In this case, the user viewing the listing is "Tony" as reflected by user welcome indicator 110. The particular property being viewed is located at 10915 Thanlet Lane in Reston, Va. This is reflected by property address indicator 20. The display screen may also include advertisements 30 and one or more toolbars 40. Capability for displaying the location of the property on a map may also be provided through the use of Map button 50. Various property information may be displayed in property information window 60. For example, in FIG. 1, the owner's initials are specified as is the land area, year built, floor area, etc. Available space window 70 provides information on the particular floors and locations available for rent within the building. Finally, button 80 provides a mechanism by which a user (in this case, the potential lessee) can communicate with the lister and button 90 provides a mechanism by which a user may email the subject listing to another party that may be interested.

Figure 2:
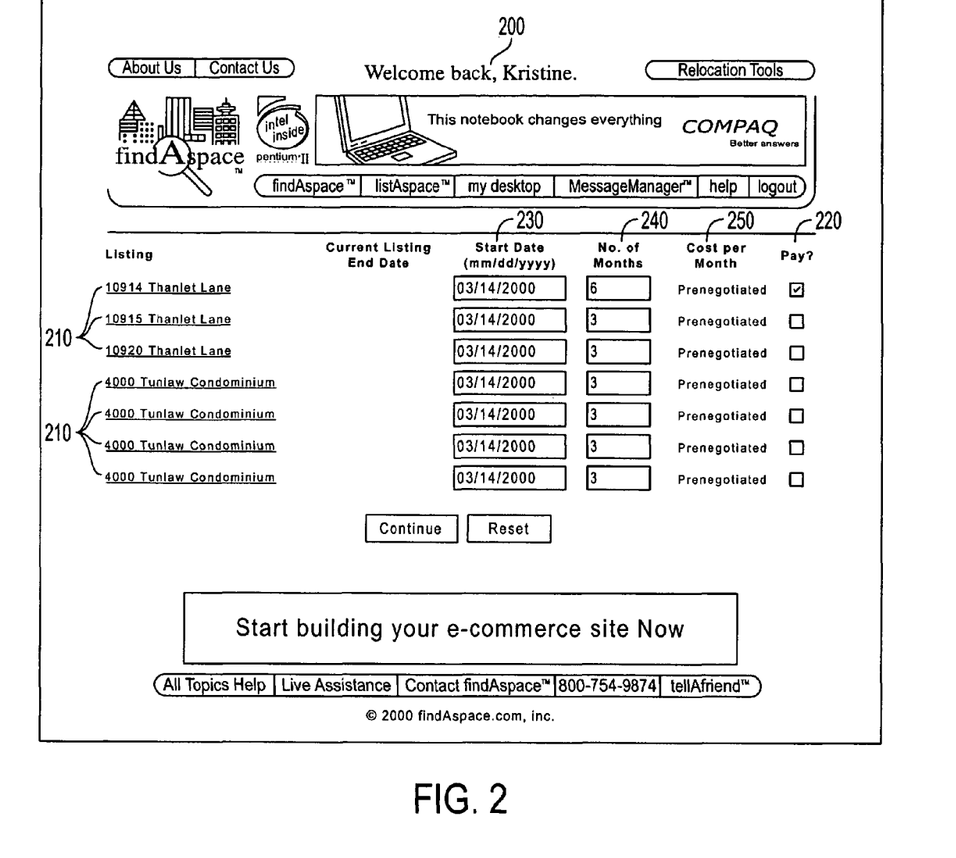
FIG. 2 is a screen shot illustrating an exemplary form which permits a user to initiate one or more property listings according to a preferred embodiment of the present invention.

FIG. 2 is a screen shot of an exemplary form whereby a lister may initiate one or more listings. In this example, Kristine (as identified by the welcome notation 200) is an advertiser who is preparing to initiate a number of listings 210 with the commercial real estate service available through the system of the present invention. For each listing 210, a start date for the listing 230 may be selected as may the number of months for which the listing will run 240. In the example, the "10914 Thanlet Lane" listing will start to run on Mar. 14, 2000 and will run for six months at a pre-negotiated price. The cost per month field 250 may reflect a specific price or a "pre-negotiated" price which is not displayed. By checking the "Pay" box 220, Kristine is specifying that she wishes to initiate and pay for one or more listings. In the FIG. 1 example, since she has checked the "pay" box for 10914 Thanlet Lane, she will be initiating the listing and initial payment associated with this particular property. It is possible to process this single listing or multiple listings at one time according to the teachings of the present invention.

Since many listings may need to run for a term which is longer than the initial term, it is often desirable to provide a mechanism for advertisers to renew listings automatically. According to the novel teachings of the present invention, advertisers may be notified by automatically generated electronic mail at predetermined times (e.g. some number of days prior to expiration of the previous listing period) that it is time to renew. Further, the advertiser may renew the listings according to the novel teachings of the present invention simply by activating the "reply" button on the advertiser's browser or via a similar application. In a preferred embodiment, it is not necessary at the time of renewal for the advertiser to do anything other than activate this button to generate a return email. For example, it is not necessary to specify a reply address, to provide credit card or other payment information, to modify the subject line or to type in any text or instructions or make any selections.

During the above registration process, the advertiser is preferably prompted to input various data and make various selections. In particular, the advertiser is asked to input billing information such as a credit card number and expiration date so that the user may be billed automatically as discussed below. The advertiser may also be required or given the opportunity to specify other preferences such as the time at which he or she would like to be notified that renewal is due and which offers would be of particular interest.

Figure 3:
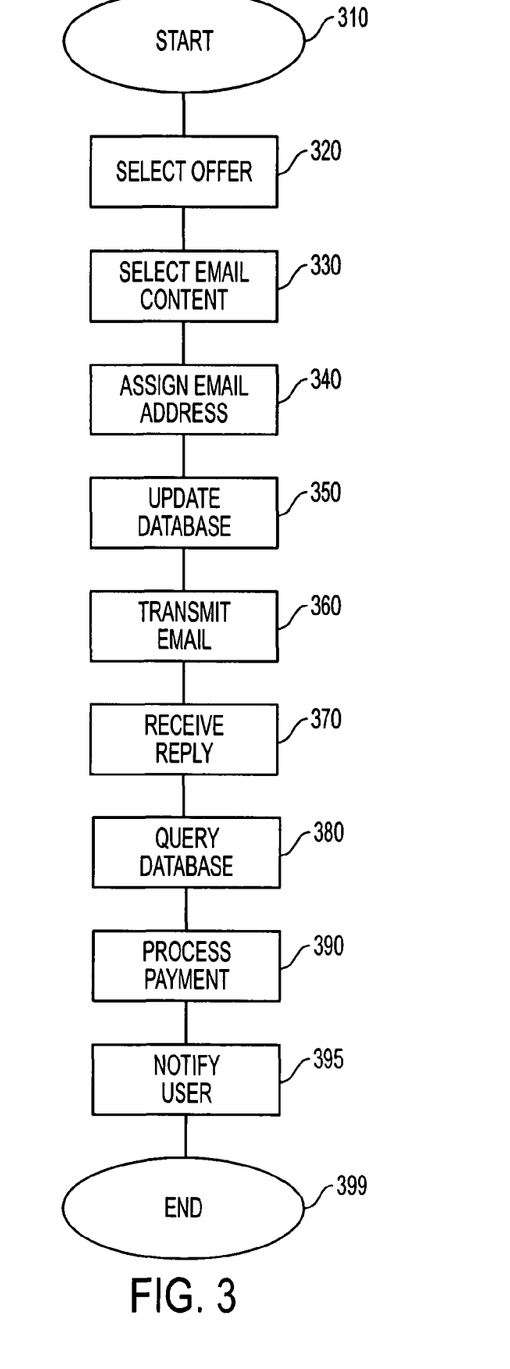
FIG. 3 is a flowchart illustrating the automated payment processing methodology according to a preferred embodiment of the present invention.

The payment processing methodology of the present invention in a preferred embodiment thereof is reflected in FIG. 3 which is a flowchart illustrating the steps for processing a payment. The process begins at step 310. Next, at step 320, the System selects an offer to make with respect to the particular advertiser. Preferably, the System contains or has access to a database which contains each of the listings currently maintained by the System as well as the expiration date of each. The System may be configured on a global basis, with respect to particular classes of advertisements or on an individual basis as to the time at which an offer is selected and an email is automatically generated for renewal purposes. By way of example, the System may be configured such that for all advertisements, an offer of renewal is selected and a resulting email is transmitted ten days prior to expiration of the previous term. As an alternative example, advertisers may themselves specify when they desire to be notified and offered an opportunity to renew. Additionally, offer selection as far as the specifics of the offer may be influenced by various factors such as the advertiser's volume of ads and the particular types of ads placed by each individual advertiser. An unlimited number of other offers are also possible in connection with this feature.

Administrators and/or other users of the System (from the service provider point of view) may design and enter various offerings which may be made in connection with renewals. There will preferably be a great deal of flexibility available so as to accommodate various marketing strategies. For example, the System may be configured such that it periodically generates offers which provide a discount for an early reply. In this case, if the advertiser replies within, for example, 5 days of receipt of the email, they may receive a discount of, for example, ten percent. The time of response may be compared against the deadline for the discount during the payment processing phase.

Following step 320, at step 330, the System of the present invention selects the content to be associated with the particular email message for transmission. The selected content is highly dependent upon the particular offer selected. In a preferred embodiment of the present invention, there exists a library of email messages that may be sent to users in connection with billing and other processes. The particular content selected may also be dependent upon the desired transaction, the selections and preferences designated by the advertiser at the time of registration, the status of the user, the user's email address as well as any combination of these factors and others. The email message may also be set up to be a generic message which may be customized in one or more "fields" so as to reflect the user and/or characteristics of the particular transaction.

Figure 4:
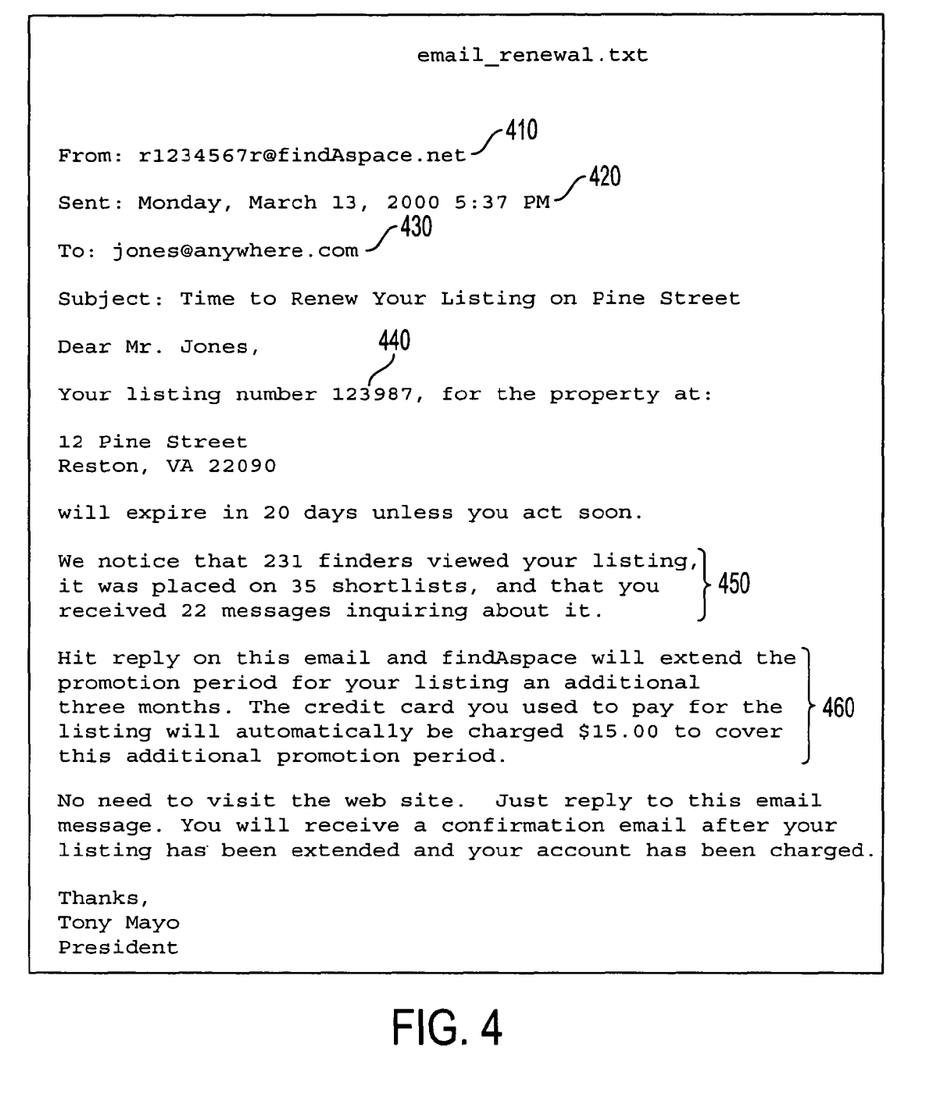
FIG. 4 is an exemplary email message which may be generated by the system of the present invention in connection with the automated processing of a billing transaction.

An example of an email message that may be generated by the System of the present invention is provided as FIG. 4. This email message is generated automatically by the System in response to a triggering event such as renewal for a listing coming due within a pre-specified number of days. In FIG. 4, "From Address" 410 (r1234567r@findAspace.net) reflects a custom generated email address which will be the target address for receipt of a reply when the user selects "reply to" on his browser or through a similar application. This will be discussed in greater detail below.

"Sent Data" 420 may provide the time and/or date that the message was generated and/or transmitted by the system to the user. The information in field 440 is indicative of an identifier assigned to the particular listing. The email address may also contain custom generated content to remind the user of the data associated with the listing. In this case, such information may include the address of the listing (12 Pine Street) and the amount of time left prior to expiration of the listing. The data in field 450 may be included to provide the user with specific information about the exposure that the listing has received or any other data which may be available on the system and which may be presented to the user to potentially aid him or encourage him to renew the listing. Field 460 provides a prompt for the user to simply use the "reply to" function on his browser in order to renew the listing without any further action on his part.

Returning now to the overall process presented in the flowchart of FIG. 3, in step 330, the content of the transmitted email message has been selected and customized for the particular transaction. In this particular case (as reflected by FIG. 4), a "standard" renewal template has been selected from the library and customized with the property address, the listing number, the time until expiration and specific exposure data. As an alternative example, if the application had been an employment site with job listings, an employer might receive, for example, an email identifying the job order, the time until expiration, various exposure data, renewal terms and directions to renew according to the teachings of the present invention.

Now, at step 340, the system generates a specific reply email address which will receive the reply email if the user activates his or her "reply" button. In the case of FIG. 4, the email address r1234567r@findAspace.net has been generated, inserted into the email template and recorded in the appropriate system database. The updating of the database is reflected by step 350 in FIG. 3. In one preferred embodiment, the system may store each of the generated email addresses and for each of these, the associated data that is necessary to automatically process the renewal and/or initiation. For example, the database may link the email address to the date sent, the "to" email address, the advertiser's name and contact information, the listing number, the time until expiration, exposure data, advertising costs and durations and other information that is helpful or desirable for use with the automated renewal or initiation of the listings. If time to expiration is stored, for example, additional follow-up emails may be sent to the advertiser with new, unique "reply to" email addresses. In this way it is possible to control and implement various marketing programs and related specials in connection with the acquisition and retention of those entities which use or may use the service provided by the System.

Once the database has been updated in step 350, it is possible for the System to transmit the customized (or a generic) email to the advertiser in step 360. The message can be sent in either or both of two ways. It is possible for a normal email message to be transmitted to the advertiser at the email address that the advertiser may have provided during the registration process or at some other time. Alternatively or in addition, an "email" may be accomplished by signaling the advertiser that a message is available to him or her on the service website. Thus, in the latter case, when the advertiser logs on to the service, he may be notified that a new message is available and it is not necessary to transmit an actual email. The advertiser can than access the message through the website and continue processing as described below.

After the advertiser receives the email he or she may choose to select the "reply to" function in his or her browser and cause an email to be returned (step 370) to a custom email address. If such a reply is received, in step 380, the System will cause the aforementioned database to be queried (step 380) so as to retrieve the information which is associated with the "reply-to" email address. For example, in the case of the FIG. 4 email, the query step may result in the payment processing application being provided with data such as the listing number, what the renewal rate is, how long until expiration of the current listing and the address of the property.

At this point, the payment may be processed at step 390. Payment processing may occur as is known in the art. For example, credit card information for the advertiser may be pre-stored or acquired during the renewal or initiation process and the advertiser's credit card may be automatically charged upon renewal or initiation. Payment processing step further preferably includes communication of the renewal or initiation to the application which manages and displays the listings appearing on the System. At step 395, the user may optionally be provided with notification (through email or otherwise) by the System that the subject listing has been successfully renewed or initiated and that the advertiser's credit card has been charged or the advertiser has otherwise been billed. The process then ends at step 399.

The System of the present invention also provides a feature whereby parties to a potential transaction may communicate with one another on an anonymous basis until such time as either or both of the parties wish to reveal their identity. For example, in the context of an advertisement offering a commercial property for rent, the landlord may wish his identity to remain confidential not only with respect to what appears in the listing but also for some time after a potential renter contacts the landlord to indicate interest. Confidentiality may be desirable for various reasons including the avoidance of providing contact information so as to avoid unwanted solicitations and/or communications. The System of the present invention provides all parties to maintain their identity in confidence while still allowing them to have unrestricted communication with each other.

Figure 5:
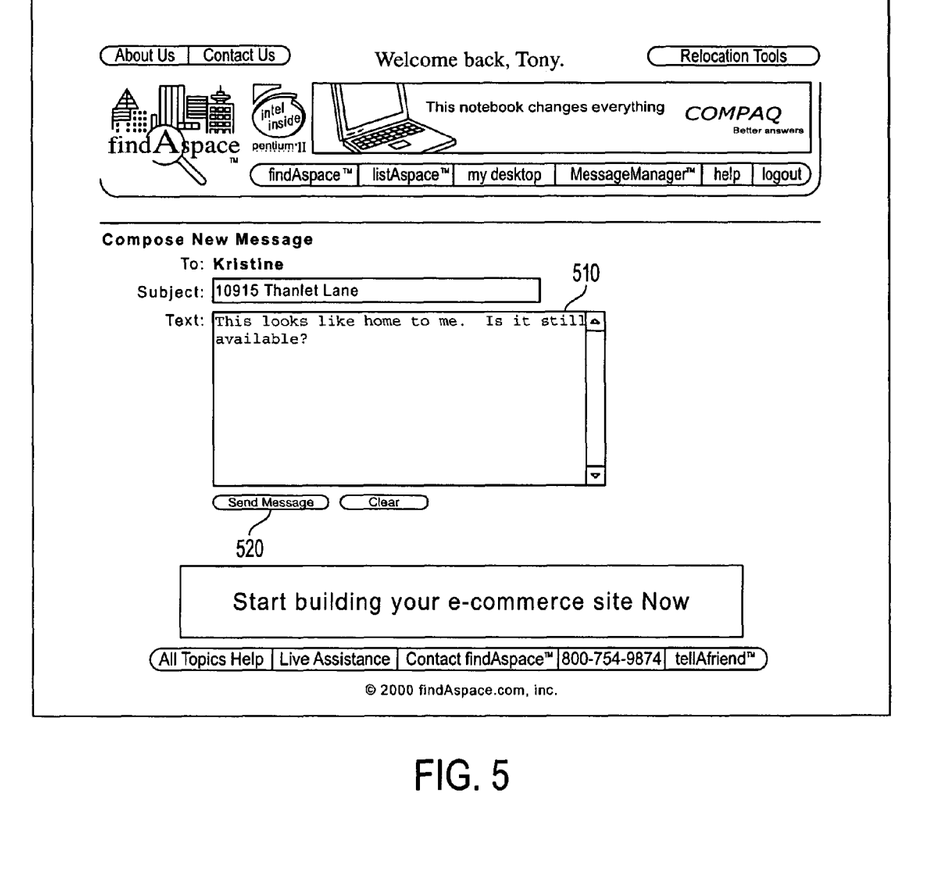
FIG. 5 is an exemplary screen shot illustrating the composition of a message in connection with the anonymous communication feature of the present invention.

FIG. 5 is an illustration of a screen presentation that may be used by a potential tenant in order to respond to a real estate listing posted through a commercial real estate advertising service available through the System. In the example to be discussed, Tony is a potential tenant who has noticed a listing of interest on the System and he has decided to respond to his potential landlord, Kristine, who is an advertiser that has placed an advertisement through the service. Although the following discussion assumes a commercial real estate context for exemplary purposes, it will be readily understood by one of skill in the art that the teachings disclosed herein have application to a large number of environments and applications especially with respect to those made available through the Internet where communication between parties is either necessary or desirable.

Returning to the example, in FIG. 5, Tony has seen the advertisement placed by Kristine for 10915 Thanlet Lane and has decided to respond. By clicking on a button or hyperlink associated with the listing, Tony can navigate to a screen such as the one illustrated in FIG. 5. In this case, Tony types in message text 510 as is shown and may click on "Send Message" button 520 in order to transmit the message. As will be discussed, the message ultimately makes its way to Kristine but not directly. Therefore, unless Tony identifies himself in the body of the text, Kristine will receive Tony's message but she will not be made aware of Tony's identity until he wishes to reveal it. It is also possible for Kristine to initiate her listing as a "blind" listing and perhaps not even include her name Kristine.

Figure 6:
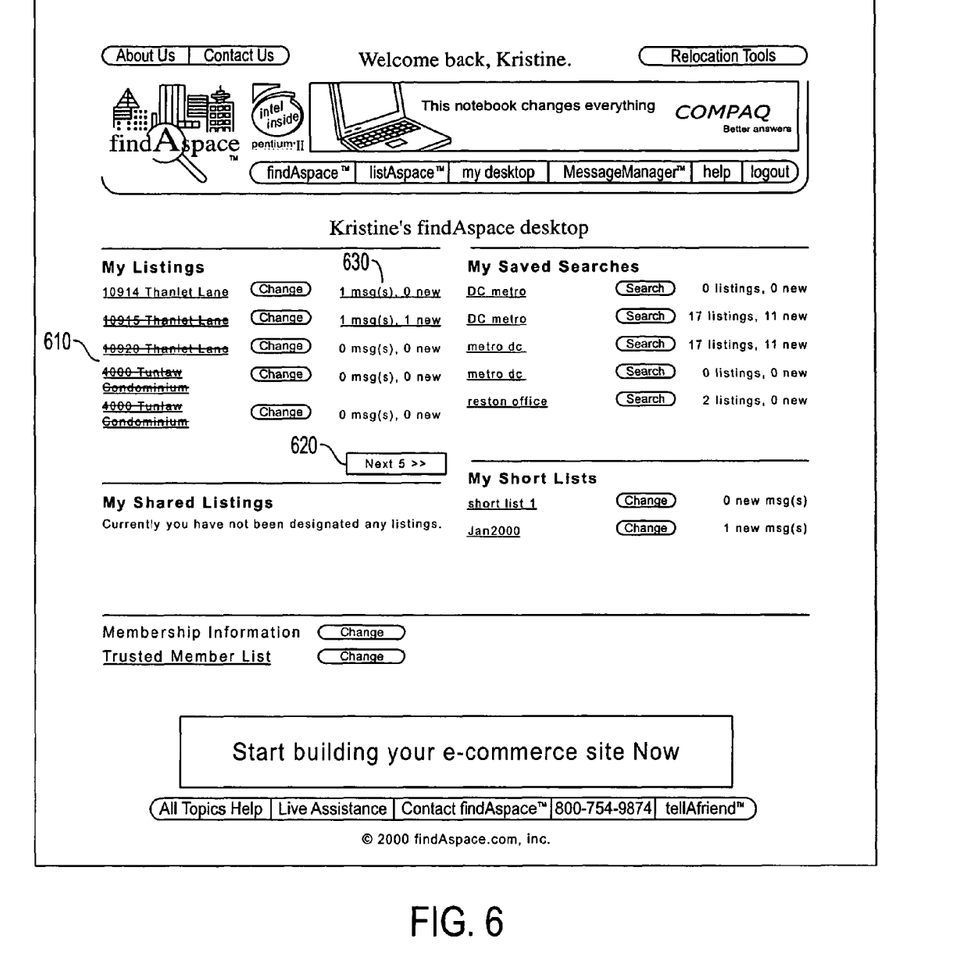
FIG. 6 is an exemplary screen shot illustrating a desktop for viewing and administering messages in connection with the anonymous communication feature of the present invention.

FIG. 6 is an example of a desktop presentation that may be made available to advertisers and/or potential respondents in connection with a preferred embodiment of the present invention. Of course, various other layouts and information may be added, deleted or substituted within the desktop while still remaining within the scope and spirit of the invention. In the "My Listings" portion 610 of the desktop, Kristine's listings are displayed. She can view additional listings by clicking on "Next 5" button 620. Particular listings that are still in the database but have been taken off the market but otherwise remain active may be crossed through as is shown in the Figure. For 10914 Thanlet Lane, message indicator 630 illustrates that there is one received message in connection with this listing. This represents the message that Tony sent to her.

Figure 7:
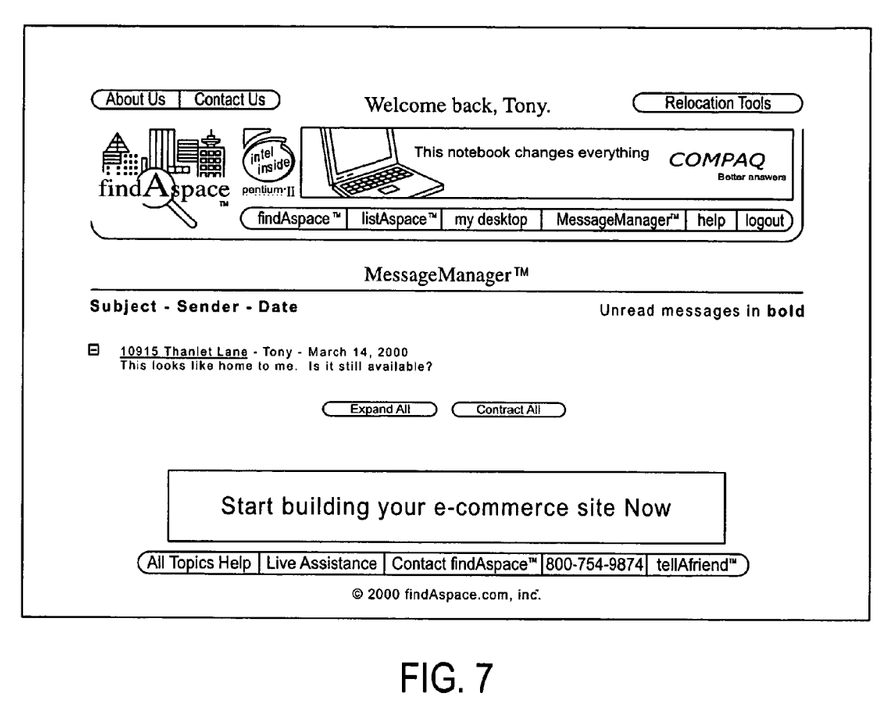
FIG. 7 is an exemplary screen shot illustrating the viewing of one or more messages in connection with the anonymous communication feature of the present invention.
Figure 8:
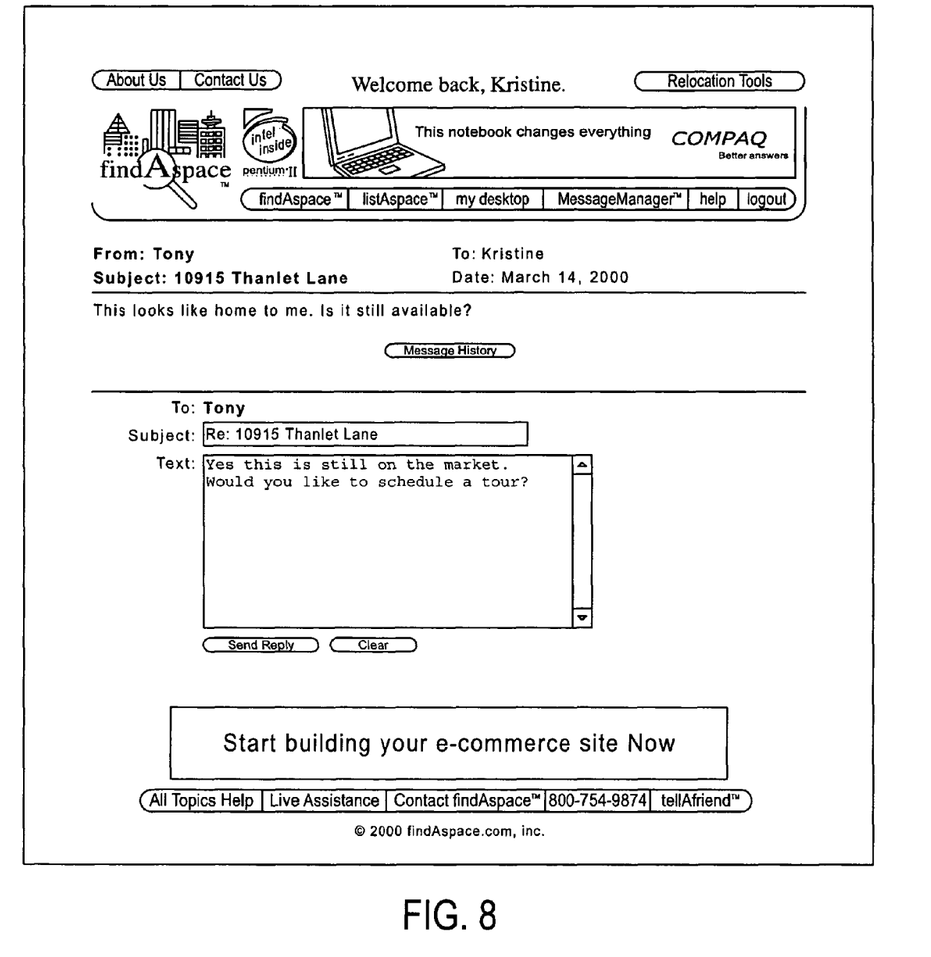
FIG. 8 is an exemplary screen shot illustrating the viewing of a message and the input of a reply message in connection with the anonymous communication feature of the present invention.

Kristine may click on message indicator hyperlink 630 at the time she wishes to view the received messages. A user presentation such as is illustrated in FIG. 7 may be displayed. According to this format, Kristine may review all messages associated with the listing in a summary format or she may expand some or all of the messages by clicking on the hyperlink associated with that message. If Kristine desires to respond, she may click on the listing and a screen such as that illustrated by FIG. 8 may appear. At that point, Kristine can type in her reply message and send it back to Tony via the System of the present invention. Communication in this fashion may continue for as long as Tony and Kristine desire to correspond. Each can become aware of the other's identity only at the point that the other desires to reveal his or her identity.

The System of the present invention preferably accomplishes the anonymous communication function as follows. When an advertiser registers with the service, he or she is asked to specify his or her email for the purposes of receiving replies to listings. That email address is mapped to a system reply to address, the latter being the destination address for replies by those viewing the advertisements. A database with the mapping scheme is preferably maintained within the System. In this fashion, when a respondent replies to a listing by selecting the "Reply to" button on the listing, the database is updated and an email may be generated and sent to the System at a system address which maps to the advertiser. The System may then automatically forward the email to the advertiser at his or her designated address by querying the mapping database in order to determine the specified address. Communication back from the advertiser to the respondent may also be processed in a similar fashion to maintain identity in confidence by mapping the destination address of the respondent to a system address at the time that the respondent replies to the listing. According to the teachings of the present invention, each of the advertiser and the respondent can view the communications transmitted back and forth through the website. In addition, email transmissions may be initiated to automatically forward the received messages to the intended recipients at their designated email addresses.

As has been noted, the teachings of the present invention including those with respect to anonymous communication may be practiced in many environments other than just a commercial real estate advertising service. For example, potential dates may be arranged in confidence through an online dating service. As another example, buyers and sellers of goods and services can communicate online without revealing their identities until the transaction is consummated.

While various preferred embodiments of the present invention have been illustrated and described, it will be apparent that various modifications and alterations may be made thereto without departing from the spirit of the invention or the scope of the appended claims.

I claim:

1. A method for processing a purchase transaction over a network comprising the steps of:
   receiving by a server first user information from a first user, where the first user information comprises an identity of the first user;
   receiving by the server a plurality of transaction descriptions;
   generating by the server a unique email address for each of the plurality of transaction descriptions, where email transmissions sent to the unique email address are accessible by the first user;
   generating by the server a transaction description page for each of the transaction descriptions, where the transaction description page includes a message soft button that initiates an email message to be sent to the unique email address associated with the transaction description and does not provide the identity of the first user;
   storing by a storage device the received plurality of transaction descriptions, the transaction description page generated for each transaction description, and the unique email address for each transaction description;
   receiving by the server a request from a second user for at least one of the plurality of transaction descriptions;
   displaying at least one of the transaction description pages by the server to the second user, where the at least one displayed transaction description page corresponds to the requested transaction description;
   receiving an email transmission by the server, where the email transmission is from the second user activating the message soft button and the email transmission is directed to the unique email address and does not provide identity of the second user;
   receiving a request by the server from the first user to view at least one of the plurality of transaction descriptions;
   generating by the server a display page comprising at least one transaction description hyper-text link and at least one message hyper-text link, where:
      a) the at least one transaction description hypertext link corresponds to one transaction description page for a transaction description; and
      b) the at least one message hyper-text link corresponds to one unique email address; and
   transmitting by the server the display page to the first user;
   receiving by the server a request to access at least one email transmission;
   transmitting an email page by the server to the first user, where the email page comprises:
      a) text of the email transmission; and
      b) a message soft button that initiates an email message to be sent to the second user at the unique email address associated with the transaction description; and
   receiving a second email transmission by the server, wherein the first user and second user anonymously communicate until at least one user chooses to reveal their identity.

2. The method of claim 1, wherein the at least one of the plurality of transaction descriptions is an offer for sale of at least one of a good and a service.

3. The method of claim 2, where the at least one of a good and a service comprises a real estate listing.

4. The method of claim 2, where the at least one of a good and a service comprises a retail product.

5. The method of claim 1, where:
a) at least one of the plurality of transaction descriptions is received from a first user;
b) each of the plurality of transaction descriptions is an offer for sale of at least one of a good and a service;
c) each of the plurality of transaction descriptions comprise identification indicia, price indicia and location indicia; and
d) each of the plurality of transaction descriptions is associated with the first user and the first user information.

6. A non-transitory computer readable medium containing code that when executed by a processor performs a purchase transaction over a network, the computer readable medium comprising:
code for receiving by a server first user information from a first user, where the first user information comprises an identity of the first user;
code for receiving by the server a plurality of transaction descriptions;
code for generating by the server a unique email address for each of the plurality of transaction descriptions, where email transmissions sent to the unique email address are accessible by the first user;
code for generating by the server a transaction description page for each of the transaction descriptions, where the transaction description page includes a message soft button that initiates an email message to be sent to the unique email address associated with the transaction description and does not provide the identity of the first user;
code for storing to a storage device the received plurality of transaction descriptions, the transaction description page generated for each transaction description, and the unique email address for each transaction description;
code for receiving by the server a request from a second user for at least one of the plurality of transaction descriptions;
code for displaying at least one of the transaction description pages by the server to the second user, where the at least one displayed transaction description page corresponds to the requested transaction description;
code for receiving an email transmission by the server, where the email transmission is from the second user activating the message soft button and the email transmission is directed to the unique email address and does not provide identity of the second user;
code for receiving a request by the server from the first user to view at least one of the plurality of transaction descriptions;
code for generating by the server a display page comprising at least one transaction description hyper-text link and at least one message hyper-text link, where:
a) the at least one transaction description hypertext link corresponds to one transaction description page for a transaction description; and
b) the at least one message hyper-text link corresponds to one unique email address; and
code for transmitting by the server the display page to the first user;
code for receiving by the server a request to access at least one email transmission;
code for transmitting an email page by the server to the first user, where the email page comprises:
a) text of the email transmission; and
b) a message soft button that initiates an email message to be sent to the second user at the unique email address associated with the transaction description; and
code for receiving a second email transmission by the server, wherein the server provides for the first user and second user to anonymously communicate until at least one user chooses to reveal their identity.

7. The computer readable medium of claim 6, wherein the at least one of the plurality of transaction descriptions is an offer for sale of at least one of a good and a service.

8. The computer readable medium of claim 7, where the at least one of a good and a service comprises a real estate listing.

9. The computer readable medium of claim 7, where the at least one of a good and a service comprises a retail product.

10. The computer readable medium of claim 6, where:
a) at least one of the plurality of transaction descriptions is received from a first user;
b) each of the plurality of transaction descriptions is an offer for sale of at least one of a good and a service;
c) each of the plurality of transaction descriptions comprise identification indicia, price indicia and location indicia; and
d) each of the plurality of transaction descriptions is associated with the first user and the first user information.

11. A system for processing a purchase transaction over a network comprising:
a server configured to:
receive first user information from a first user, where the first user information comprises an identity of the first user;
receive a plurality of transaction descriptions;
generate a unique email address for each of the plurality of transaction descriptions, where email transmissions sent to the unique email address are accessible by the first user;
generate a transaction description page for each of the transaction descriptions, where the transaction description page includes a message soft button that initiates an email message to be sent to the unique email address associated with the transaction description and does not provide the identity of the first user;
a storage device linked to the server and configured to:
store the received plurality of transaction descriptions, the transaction description page generated for each transaction description, and the unique email address for each transaction description;
said server configured to receive a request from a second user for at least one of the plurality of transaction descriptions;
an output device linked to the server configured to:
display at least one of the transaction description pages to the second user, where the at least one displayed transaction description page corresponds to the requested transaction description;
said server configured to:
receive an email transmission, where the email transmission is from the second user activating the message soft button and the email transmission is directed to the unique email address and does not provide identity of the second user;

receive a request from the first user to view at least one of the plurality of transaction descriptions;

generate a display page comprising at least one transaction description hyper-text link and at least one message hyper-text link, where:
 a) the at least one transaction description hyper-text link corresponds to one transaction description page for a transaction description; and
 b) the at least one message hyper-text link corresponds to one unique email address; and transmit the display page to the first user;

receive a request to access at least one email transmission;

transmit an email page to the first user, where the email page comprises:
 a) text of the email transmission; and
 b) a message soft button that initiates an email message to be sent to the second user at the unique email address associated with the transaction description; and receive a second email transmission, wherein the first user and second user to anonymously communicate until at least one user chooses to reveal their identity.

12. The system of claim 11, wherein the at least one of the plurality of transaction descriptions is an offer for sale of at least one of a good and a service.

13. The system of claim 12, where the at least one of a good and a service comprises a real estate listing.

14. The system of claim 12, where the at least one of a good and a service comprises a retail product.

15. The system of claim 11, where:
 a) at least one of the plurality of transaction descriptions is received from a first user;
 b) each of the plurality of transaction descriptions is an offer for sale of at least one of a good and a service;
 c) each of the plurality of transaction descriptions comprise identification indicia, price indicia and location indicia; and
 d) each of the plurality of transaction descriptions is associated with the first user and the first user information.

16. A method for processing a purchase transaction over a network comprising the steps of:
 receiving by a server first user information from a first user, where the first user information comprises an identity of the first user;
 receiving by the server a transaction description;
 generating by the server a unique email address for the transaction description, where email transmissions sent to the unique email address are accessible by the first user;
 generating by the server a transaction description page for the transaction description, where the transaction description page includes a message soft button that initiates an email message to be sent to the unique email address associated with the transaction description and does not identify the first user;
 storing by a storage device the received transaction description, the transaction description page generated for the transaction description, and the unique email address for each transaction description;
 receiving by the server a request from a second user for the transaction description;
 displaying the transaction description page by the server to the second user;
 receiving an email transmission by the server, where the email transmission is from the second user activating the message soft button, the email transmission is directed to the unique email address and does not provide identity of the second user;
 receiving a request by the server from the first user to view the transaction description;
 generating by the server a listing page containing the transaction description and at least one message hyper-text link, where the at least one message hyper-text link corresponds to a unique email address;
 transmitting by the server a display page to the first user;
 receiving by the server a request to access at least one email transmission;
 transmitting an email page by the server to the first user, where the email page comprises:
  a) text of the email transmission; and
  b) a message soft button that initiates an email message to be sent to the second user at the unique email address associated with the transaction description; and
 receiving a second email transmission by the server, wherein the server provides for the first user and second user to anonymously communicate until at least one users chooses to reveal their identity.

17. The method of claim 16, wherein the transaction descriptions is an offer for sale of at least one of a good and a service.

18. The method of claim 17, where the at least one of a good and a service comprises a real estate listing.

19. The method of claim 17, where the at least one of a good and a service comprises a retail product.

20. The method of claim 16, where:
 a) the plurality of the transaction description is received from a first user;
 b) the transaction descriptions is an offer for sale of at least one of a good and a service;
 c) the transaction description comprise identification indicia, price indicia and location indicia; and
 d) the transaction description is associated with the first user and the first user information.

21. A non-transitory computer readable medium containing code that when executed by a processor causes a purchase transaction over a network, the computer readable medium comprising:
 code for receiving by a server first user information from a first user, where the first user information comprises an identity of the first user;
 code for receiving by the server a transaction description;
 code for generating by the server a unique email address for the transaction description, where email transmissions sent to the unique email address are accessible by the first user;
 code for generating by the server a transaction description page for the transaction description, where the transaction description page includes a message soft button that initiates an email message to be sent to the unique email address associated with the transaction description and does not identify the first user;
 code for storing to a storage device the received transaction description, the transaction description page generated for the transaction description, and the unique email address for each transaction description;
 code for receiving by the server a request from a second user for the transaction description;
 code for displaying the transaction description page by the server to the second user;

code for receiving an email transmission by the server, where the email transmission is from the second user activating the message soft button, the email transmission is directed to the unique email address and does not provide identity of the second user;

code for receiving a request by the server from the first user to view the transaction description;

code for generating by the server a listing page containing the transaction description and at least one message hyper-text link, where the at least one message hyper-text link corresponds to a unique email address;

code for transmitting by the server the display page to the first user;

code for receiving by the server a request to access at least one email transmission;

code for transmitting an email page by the server to the first user, where the email page comprises:
  a) text of the email transmission; and
  b) a message soft button that initiates an email message to be sent to the second user at the unique email address associated with the transaction description; and code for receiving a second email transmission by the server, wherein the server provides for the first user and second user to anonymously communicate until at least one user chooses to reveal their identity.

22. The computer readable medium of claim 21, wherein the transaction descriptions is an offer for sale of at least one of a good and a service.

23. The computer readable medium of claim 22, where the at least one of a good and a service comprises a real estate listing.

24. The computer readable medium of claim 22, where the at least one of a good and a service comprises a retail product.

25. The computer readable medium of claim 21, where:
  a) the transaction descriptions is received from a first user;
  b) the transaction descriptions is an offer for sale of at least one of a good and a service;
  c) the transaction description comprise identification indicia, price indicia and location indicia; and
  d) the transaction descriptions is associated with the first user and the first user information.

26. A system for processing a purchase transaction over a network comprising:
  a server configured to:
    receive first user information from a first user, where the first user information comprises an identity of the first user;
    receive a transaction description;
    generate a unique email address for the transaction description, where email transmissions sent to the unique email address are accessible by the first user;
    generate a transaction description page for the transaction description, where the transaction description page includes a message soft button that initiates an email message to be sent to the unique email address associated with the transaction description and does not identify the first user;
  a storage device linked to the server configured to:
    store the received transaction description, the transaction description page generated for the transaction description, and the unique email address for each transaction description;
  said server further configured to:
    receive a request from a second user for the transaction description;
  an output device linked to the server configured to:
    the display the transaction description page to the second user;
  said server configured to:
    receive an email transmission, where the email transmission is from the second user activating the message soft button, the email transmission is directed to the unique email address and does not provide identity of the second user;
    receive a request from the first user to view the transaction description;
    generate a listing page containing the transaction description and at least one message hyper-text link, where the at least one message hyper-text link corresponds to a unique email address;
    transmit the display page to the first user;
    receive a request to access at least one email transmission;
    transmit an email page to the first user, where the email page comprises:
      a) text of the email transmission; and
      b) a message soft button that initiates an email message to be sent to the second user at the unique email address associated with the transaction description; and
    receive a second email transmission, wherein the the first user and second user to anonymously communicate until at least one user chooses to reveal their identity.

27. The system of claim 26, wherein the transaction descriptions is an offer for sale of at least one of a good and a service.

28. The system of claim 27, where the at least one of a good and a service comprises a real estate listing.

29. The system of claim 27, where the at least one of a good and a service comprises a retail product.

30. The system of claim 26, where:
  a) the transaction description is received from a first user;
  b) the transaction description is an offer for sale of at least one of a good and a service;
  c) the transaction description comprise identification indicia, price indicia and location indicia; and
  d) the transaction description is associated with the first user and the first user information.

* * * * *